United States Patent [19]

Verdenne et al.

[11] Patent Number: 4,545,697

[45] Date of Patent: Oct. 8, 1985

[54] DEVICE FOR FIXING BY SCREWING ONTO A CHANNEL SECTION AND THE COMBINATION OF A CHANNEL SECTION AND SUCH A DEVICE

[75] Inventors: Serge Verdenne, Marcilly sur Tille; Didier Brocard, Dijon; Pierre Hardouin, Asnieres; Félix Lameyre, Rueil, all of France

[73] Assignee: La Telemecanique Electrique, Nanterre, France

[21] Appl. No.: 426,185

[22] Filed: Sep. 28, 1982

[30] Foreign Application Priority Data

Oct. 7, 1981 [FR] France .................................. 81 18846

[51] Int. Cl.⁴ .......................... F16B 9/00; A44B 17/00
[52] U.S. Cl. .................................. 403/230; 403/252; 403/348; 403/405.1; 411/85; 411/349; 411/552
[58] Field of Search ............... 403/230, 252, 254, 405, 403/406, 407, 408, 348; 411/84, 85, 401, 349, 549, 552

[56] References Cited

U.S. PATENT DOCUMENTS

| 3,059,584 | 10/1962 | Schreyer . | |
| 3,208,560 | 12/1961 | Cote | 403/252 |
| 3,429,601 | 2/1969 | Bremers | 403/230 |
| 3,483,910 | 12/1969 | La Londe et al. | 411/84 X |
| 3,982,841 | 9/1976 | Endzweig | 403/348 |

FOREIGN PATENT DOCUMENTS

| 2628324 | 1/1977 | Fed. Rep. of Germany | 411/401 |
| 1167853 | 12/1958 | France . | |
| 2144914 | 2/1973 | France . | |
| 2468784 | 10/1979 | France | 411/85 |
| 2457407 | 12/1980 | France . | |
| 791740 | 1/1957 | United Kingdom | 403/230 |
| 1061149 | 3/1967 | United Kingdom . | |
| 1579941 | 11/1980 | United Kingdom | 403/230 |
| 407095 | 11/1973 | U.S.S.R. | 403/405 |

OTHER PUBLICATIONS

Unistrut; General Engineering Catalog, No. 9, ©1980 and 1981, pp. 7–8, 25–28, 96 and 103
New Holdnut for Kindorf Channel; Steel City Division, Jun. 27, 1967.

*Primary Examiner*—Cornelius J. Husar
*Assistant Examiner*—Todd G. Williams
*Attorney, Agent, or Firm*—Young & Thompson

[57] ABSTRACT

The device for fixing an object by screwing to a section having two flanges directed substantially towards one another and defining therebetween a longitudinal opening comprises an elongated plate provided with one of the threaded portions and rotatable in a plane substantially parallel to that of the flanges of the section. In a free position, the longitudinal direction of the plate corresponds substantially to that of the section. In a retained position, the plate is retained under the flanges of the section and immobilized in one at least of the directions of rotation. Resilient means are provided for urging the plate towards the flanges of section in the retained position. The resilient means bear on a wedge intended to be inserted between the external face of the flanges of the section and the object to be fixed. This wedge has a passageway for a connecting rod between the plate and the other screw fixing element.

14 Claims, 19 Drawing Figures

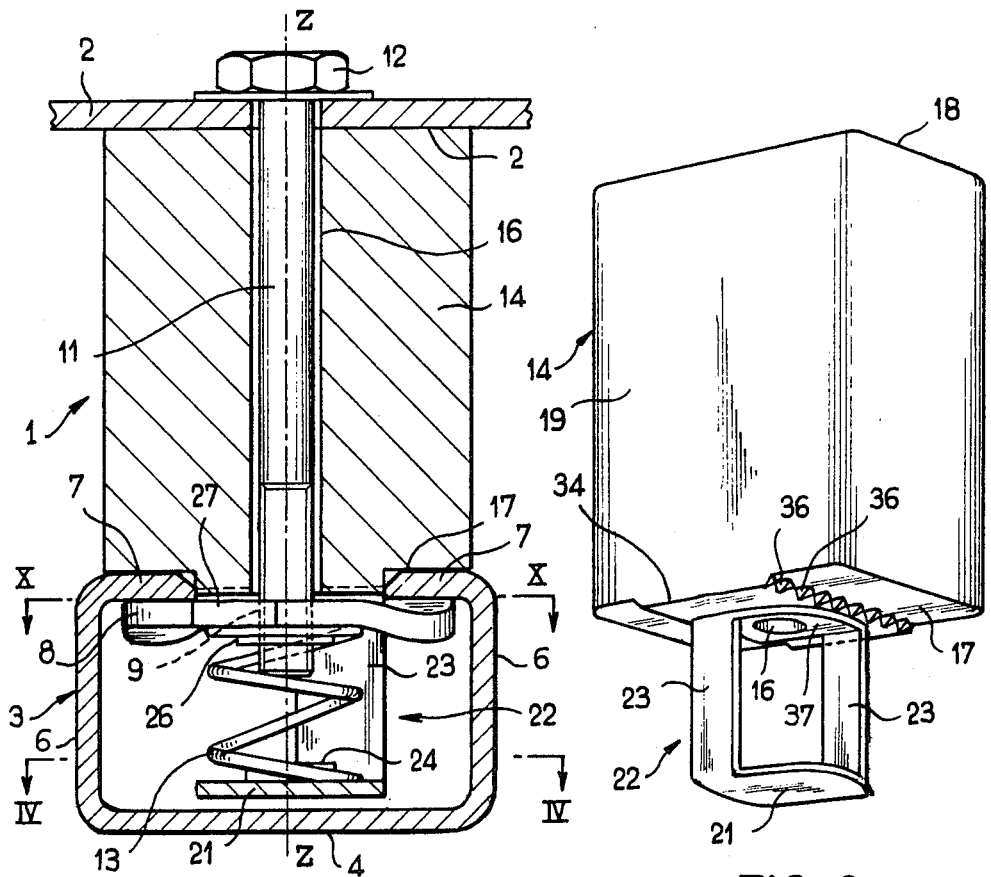
FIG_1
FIG_2
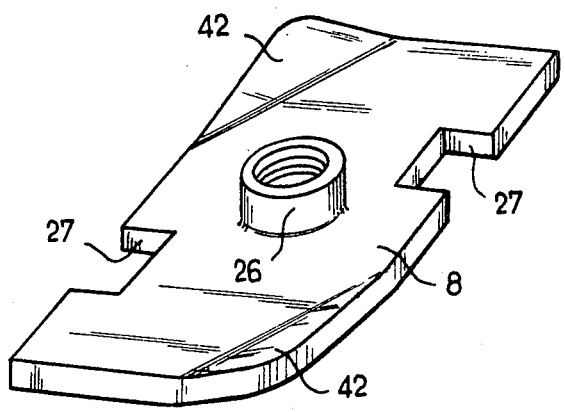
FIG_3
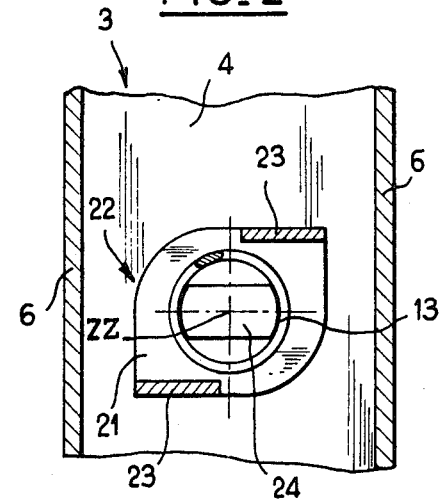
FIG_4

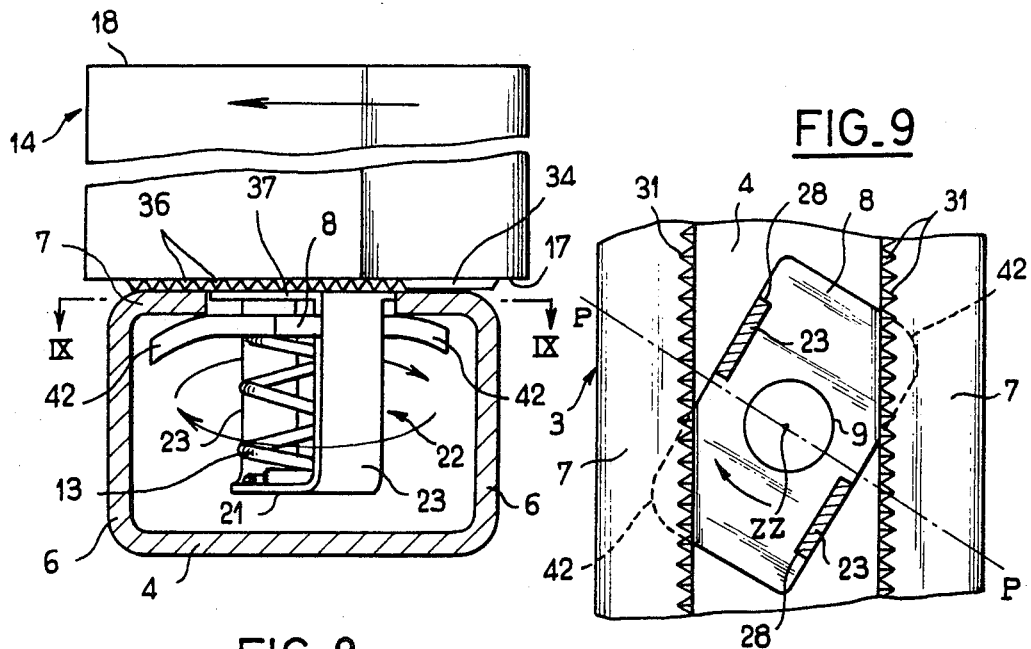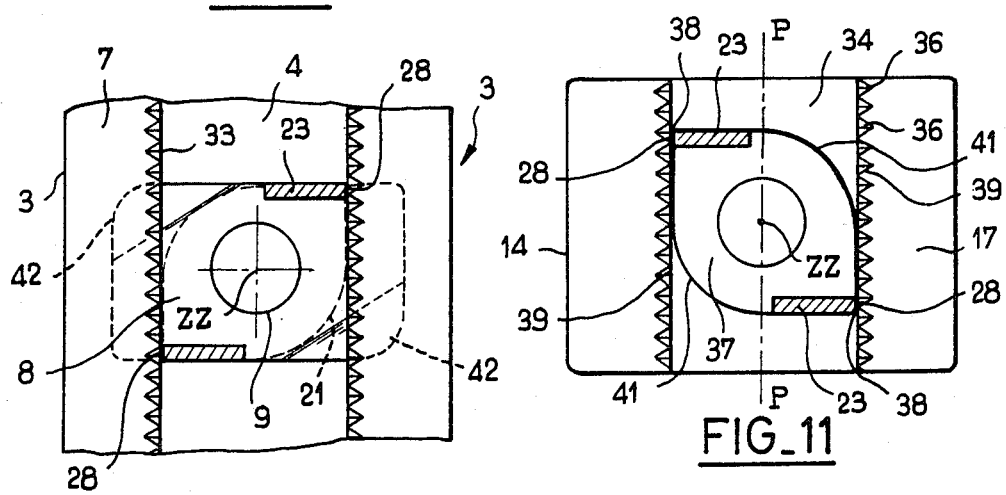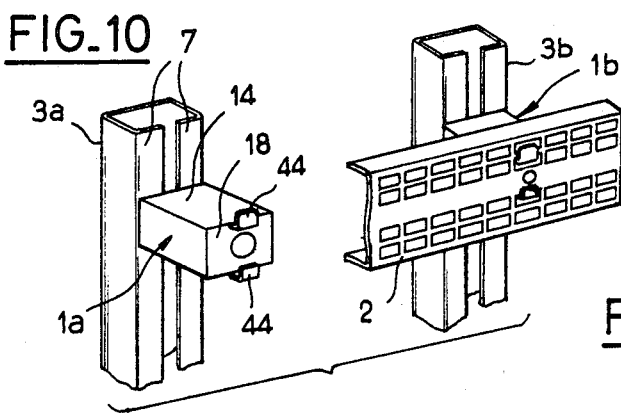

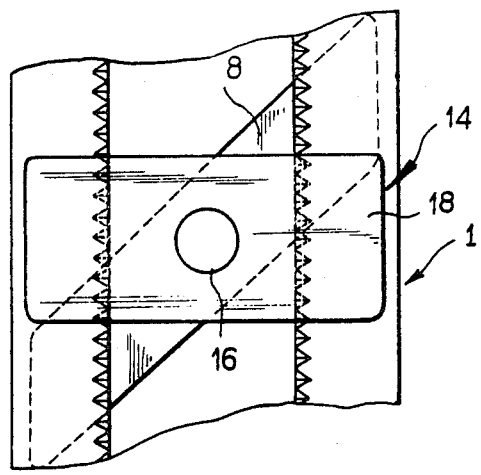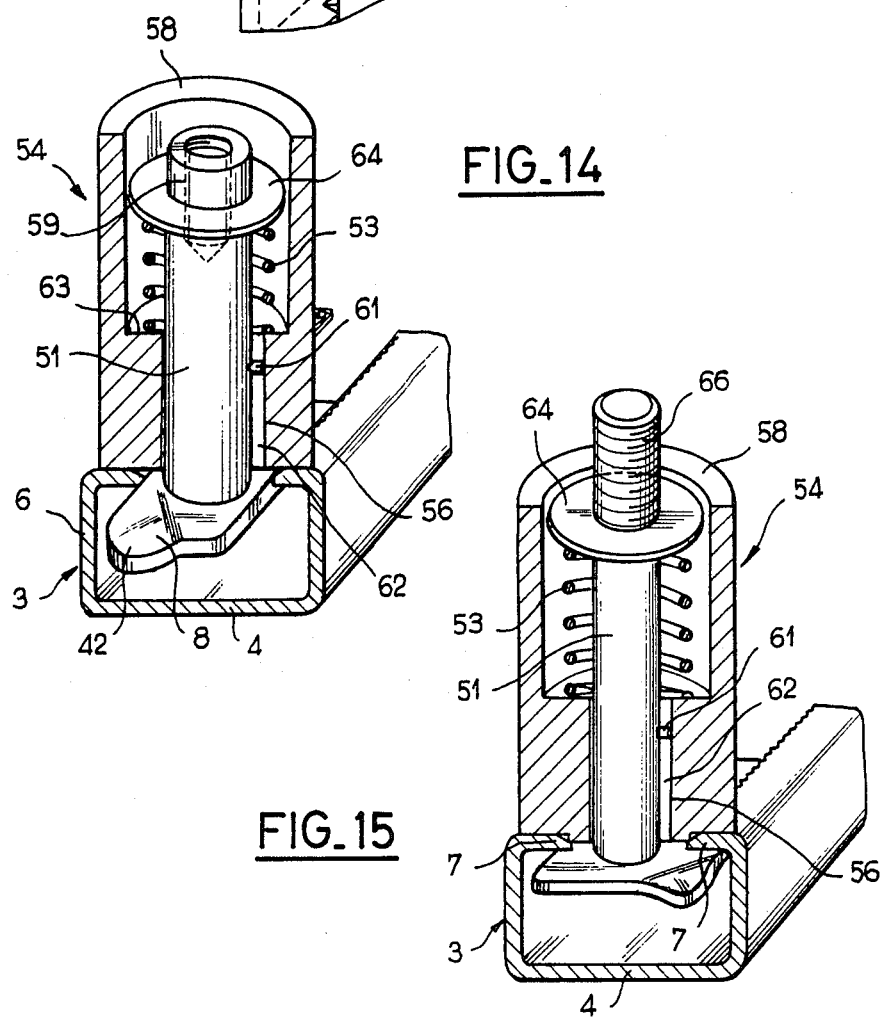

DEVICE FOR FIXING BY SCREWING ONTO A CHANNEL SECTION AND THE COMBINATION OF A CHANNEL SECTION AND SUCH A DEVICE

The present invention relates to a device for fixing an object by screwing onto a section having two flanges directed towards each other, preferably a C-shaped section.

The invention relates also to the combination of such a section and such a device.

The device as well as the combination to which the invention relates generally, and in a non-limiting way, serve for fixing to the section objects such as apparatus or supports for apparatus or else another section or profiled element. They are met with more particularly in electric apparatus cabinets, in which the sections form vertical uprights which are connected together by perforated horizontal metal strips to which the apparatus will be fixed. The fixing device then serves for fixing the perforated strips to the vertical sections.

Devices are known for fixing an object by screwing onto a section, which comprise an elongated threaded plate which is engaged between the flanges of the section by orientating it in the direction of the section, then rotating it to engage it under the flanges of the section. After this rotation, the plate reaches a position in which, because of its shape, it abuts against the walls of the section, which therefore ensures that it is immobilized during screwing. The longitudinal direction of the plate is then transverse to that of the section. A spring bearing onto the section applies the plate flat under the flanges of the section.

In certain known constructions, the resilient means applying the plate under the flanges of the section consist of a helical spring bearing on the bottom of the section. This solution is particularly inconvenient for, during screwing, the operator inevitably presses the plate, which generally causes the spring to slip which finishes askew or lying in the section. It is then very difficult to put it back in place because of the poor accessibility to the interior of the section. If the section is not horizontal the plate and the spring may fall to the lower end of the section, where it will perhaps be impossible to recover them.

In addition, the screw may screw off and the plate become loose in structures subject to vibrations.

To remedy these disadvantages, devices have been provided in which the resilient means comprise one or more spring blades fixed to the plate, projecting from the section through the longitudinal opening thereof and bearing on the external face of its flanges. Thus, the spring no longer risks being separated from the plate or taking up askew position during screwing. However, use thereof is still rather inconvenient for the plate, which can only be gripped by its relative small and cutting spring or else by engaging the fingers in the section or even with a tool, is difficult to engage and slide in the section and then to maintain in the desired position during fitting. Once the fittings have been carried out, the spring is nipped between the flanges of the section and the object to be fixed, which may damage this latter or else not provide a sufficient stability of fixing.

When one or other of the known constructions which just have been mentioned is combined with a particular type of section, there is provided on the lower face of the flanges of the section and on the plate a series of notches for preventing the device from slipping if only in the longitudinal direction of the section, once the screwing has been carried out, this latter causing the firm interengagement of the notches of the plate with those of the section.

During fitting, the resilient means tend to cause this interengagement before screwing. However, this does not facilitate holding the plate in position during screwing for, at this stage, the operator generally exerts on the plate a thrust which frees the plate from the notches of the section and so allows the plate to slip as if the notches did not exist.

The aim of the invention is to remedy these disadvantages, namely to facilitate and make more efficient the securing of objects to sections by providing:

a device of the kind mentioned in the introduction in which gripping of the plate, handling it and holding it in position during screwing are readily carried out, while providing stable fixing of the object to the section; and a combination of this device with a section, in which the screwing force does not promote sliding of the device along the section.

The invention thus provides a device for fixing an object by screwing to a section having two flanges directed substantially towards each other and defining there between a longitudinal opening. This device comprises an elongated plate, acting as a first screw fixing element, and rotatable in a plane substantially parallel to that of the flanges of the section, between a free position in which its longitudinal direction corresponds substantially to that of the section, and a position in which it is held under the flanges of the section and immobilized in one at least of the directions of rotating, resilient means being provided for urging the plate in the held position towards the flanges of the section.

According to the invention, this device is characterized in that the resilient means act between the plate and a wedge intended to be inserted between the external face of the flanges of the section and the object to be fixed, this wedge having a passage for a connecting rod between the plate and a second screw fixing element.

With the wedge, the device can be gripped and readily moved along the section without having to put one's fingers inside the section. To prevent the device from sliding along the section while the object to be fixed is associated therewith, it is easy to hold the device by means of the wedge. Once the fixing has been carried out, the wedge provides a very stable support for the fixed object. Furthermore, by choosing the thickness of the wedge, the position of the fixed object may be adjusted in the direction transversal to the flanges of the section.

According to the second aspect of the invention, the combination of the above device and a section having two flanges directed substantially towards one another and defining there between a longitudinal opening, the fixing device and the flanges of the section having mutual gripping means intended to cooperate under the effect of the resilient means and, after fitting, under the effect of clamping by screwing, to prevent the translational movement of the device in the section, is characterized in that the gripping means are provided respectively on the external face of one at least of the flanges of the section and on the face of the wedge intended to bear thereon.

Thus, when a pressure is applied to the plate during screwing, the force is transmitted to the wedge which is thus applied more forcibly against the flanges of the section. The efficiency of the gripping means is then reinforced, instead of being cancelled out as was the case with known devices. Furthermore, when it is desired to move the device along the section, it is sufficient to pull the wedge in order to disengage the gripping means whereas, in the prior art, it was necessary to put one's fingers into the section to press on the plate, while pushing at the same time in the desired direction.

Other features and advantages of the invention will become clear from the following description.

In the accompanying drawings given by way of non-limiting examples:

FIG. 1 is a view of the device used for fixing a perforated plate to a section, this view being seen in section through a plane perpendicular to the direction of the support section passing through the screwing axis of the device;

FIG. 2 is a perspective view of the wedge device;

FIG. 3 is a perspective view of the lower face of the plate;

FIG. 4 is a sectional view through the plane IV-IV of FIG. 1;

FIGS. 6 and 8 are views similar to that of FIG. 1, but showing the device with the plate in the engaged position and passing from the engaged position to the held position respectively;

FIGS. 7 and 9 are sectional views through planes VII—VII and IX—IX of FIGS. 6 and 8, respectively;

FIG. 10 is a sectional view, through plane X—X of FIG. 1;

FIG. 11 is a view of the face of the wedge intended to bear on the section, the arms of the stirrup-shaped piece being cut away;

FIG. 12 is a perspective view with parts cut away of a perforated strip, fixed horizontally by means of two devices in accordance with the invention to two sections forming vertical uprights;

FIG. 13 is a top view of a variation of the device;

FIGS. 14 and 15 are two perspective views, with the wedge and spring shown in axial section and the support member in section through the same plane, and two variations of the invention;

Figure 5:
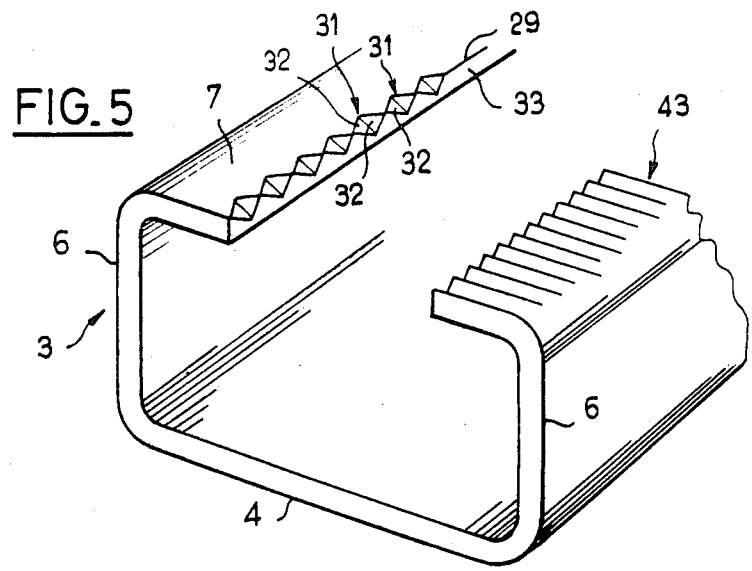
FIG. 5 is a perspective view of the section, each of the flanges being shown as constructional variations.
Figure 6:
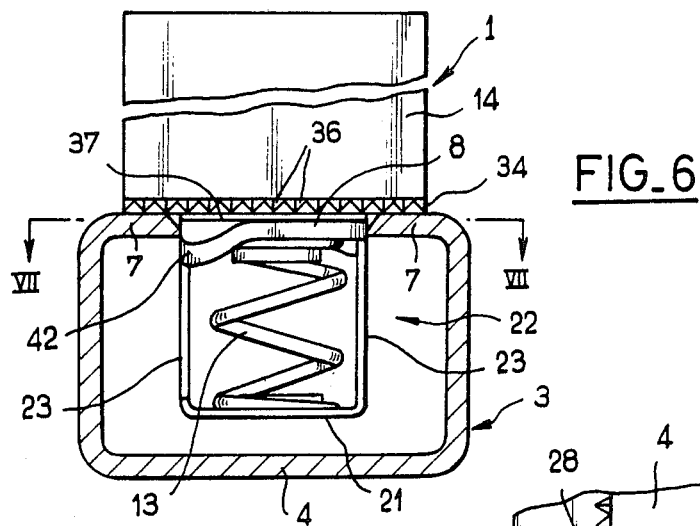

In the example shown in FIG. 1, the device 1 serves for fixing a metal strip 2 in any desired position along the C-shaped section 3. The section 3 has a bottom 4, two side walls 6 and two end flanges 7 directed towards each other and defining between their ends a longitudinal opening of the section.

Figure 7:
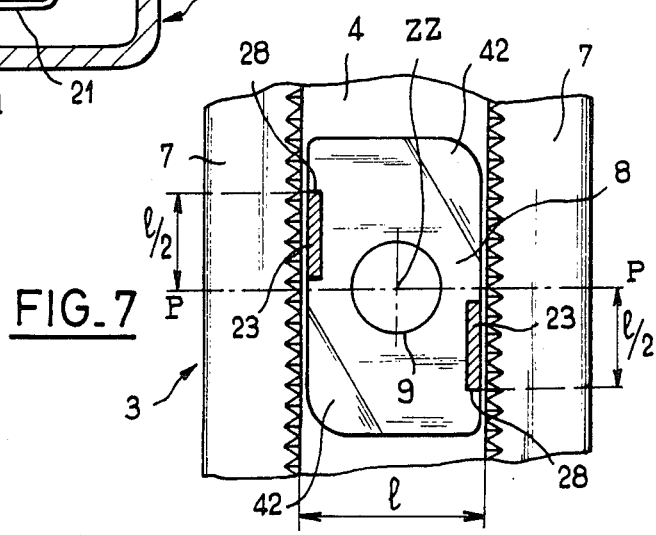

The device comprises a generally rectangular shaped plate 8, whose width is smaller and length longer than the width of the longitudinal opening of section 3 (see FIGS. 7, 9 and 10). Plate 8 is rotatable in a plane substantially parallel to that of flanges 7, between a free position in which its length is in the direction of the length of section 3, and in which it may pass between flanges 7 of section 3, without being slanted (FIG. 7), and a held position, in which its length is in the direction of the width of section 3 (FIGS. 1 and 10) and in which it is applied substantially flat against the internal face of flanges 7. Seen from the external face of flanges 7, plate 8 passes from its free position to its held position by rotation in a clockwise direction, and means which will be described in detail further on prevent the plate from going beyond the held or retained position.

Plate 8 has at its centre a threaded hole 9 whose axis Z—Z passes substantially through the median line of the longitudinal opening of section 3. The threaded hole 9 cooperates with the thread of the shank of a screw 11 whose head 12, situated externally of section 3, bears on the face of the strip 2 opposite section 3. A spring 13 permanently urges plate 8 against the internal face of flanges 7.

In accordance with the invention, the device 1 further comprises a wedge 14 interposed between strip 2 and the external face of flanges 7. Wedge 14 has an axial bore 16 for passing therethrough shank 11 from the head 12 as far as plate 8. In the example shown, wedge 14 is substantially parallelipedic and has two opposite bases 17, 18 bearing respectively on section 3 and on strip 2, and a side wall with rounded edges. The length and the width of base 17 are greater than the width l of the longitudinal opening of section 3.

The helical spring 13 is placed between the face of plate 8 directed towards bottom 4 of section 3 and the central part 21 of a stirrup-shaped piece 22 whose arms 23 are fixed to the base 17 of wedge 14 by their end opposite the central part 21. For guiding spring 13, the central part 21 carries a cylindrical boss 24, whereas plate 8 carries on its face opposite wedge 14, a flange 26 surrounding the threaded hole 9. Arms 23 are carried in mutually parallel planes which, in operation, are substantially perpendicular to the plane of plate 8. The external face of one of the arms 23 is separated from the external face of the other arm 23 by a distance less than the width of the longitudinal opening of section 3. Preferably, this distance is equal to the width of plate 8.

Plate 8 is mounted between the arms 23 of stirrup piece 22 so that it may slide between arms 23, in direction Z—Z of the axis of shank 11, which is perpendicular to the plane of plate 8, but so that it must rotate with wedge 14 about axis Z—Z. To this end, plate 8 has on each of its longitudinal edges a recess 27 (FIG. 3) whose depth corresponds substantially to the thickness of arms 23. The plane of arms 23 is parallel to the longitudinal direction of the section when the plate is in the free position and perpendicular to this direction when the plate is in the held or retained position. As is shown more especially in FIG. 7, arms 23 of the stirrup piece are not facing each other but are on the contrary offset with respect to the plane P—P passing through the axis Z—Z and through the small median of plate 8, so that they are both situated wholly on the side towards which plane P—P moves when the plate 8 passes from its free position (FIG. 7) to its retained position (FIG. 10). On each arm 23, edge 28 which is opposite plane P—P (FIG. 7) is spaced from plane P—P by a distance which is equal to half the width l of the longitudinal opening of section 3. Thus, since each of the arms 23 is on the above-mentioned side of plane P—P, they do not hinder rotation of plate 8 from its free position to its retained position (FIG. 9), and, in this latter position, each of the edges 28, because of its spacing from plane P—P, abutts against the edge of one of flanges 7 of section 3 and thus prevents the plate from passing beyond the retained position (FIG. 10).

Device 1 and section 3 have mutual gripping means intended to cooperates under the effect of spring 13 and, after fitting, under the effect of clamping by screwing, to prevent the device 1 from sliding accidentally in section 3. According to an important feature of the invention, these gripping means comprise a series of notches formed in the external face of flanges 7 of section 3 and on the face 17 of wedge 14. More particularly, in the example shown in FIGS. 1 to 4 and 9 to 11, as well as in the left-hand part of FIG. 5, the series of notches is formed by V-section notches formed in the outer endmost square edge 29 of each of flanges 7. Each notch 31 has two triangular faces 32 whose adjacent bases, which form the bottom of the notch, are perpendicular to the square edge 39 and form an angle of 45° not only with the external face of flanges 7 but also with the endmost face 33 of said flanges. The apex of each triangular face 32 is adjacent to the apex of a triangular face 32 of an adjacent edge.

Wedge 14 also has two rows of mutually parallel notches, symmetrical with each other with respect to the plane passing through the axis Z—Z and through the small median of base 17. These notches are formed on each side of a parallelipipedic boss 34 extending along the small median of base 17, from one end to the other thereof. They are formed of teeth 36 having a shape complementary to that of notches 31.

Boss 34 has the same width l as the longitudinal opening of section 3 and when plate 8 is in the retained position, it is fitted between the flanges 7 of section 3, whereas teeth 36 are interengaged with notches 31.

As shown in FIGS. 2, 8 and 11, boss 34 carries a second boss 37 whose face directed towards the bottom 4 of section 3 is flat and parallel to base 17 and whose side wall is parallel at all points to the axis Z—Z and presents at all points the symmetry of order 2 with respect to this axis. The lateral wall of boss 37 has two edges 38, each being common with the edge connecting the lateral wall of one of arms 23 with the edge wall 18 of these arms 23. From each of the square edges 38, side wall extends parallel to plane P—P substantially over the distance ½ and in this portion, it is coplanar with wall 38 of arm 23 and also with the side wall of boss 34. On the other side of square edge 38, the side wall of boss 37 extends perpendicularly to plane P—P, substantially until it meets this latter, and in this part, the side wall of boss 37 is coplanar with the outer wall of the associated arm 23. The two dihedrons, symmetrical with respect to axis Z—Z, which are thus defined, are connected by two arcs of a circle 41 having axis Z—Z.

The sum of the height of bosses 34 and 37 is less than the thickness of the metal sheet forming section 3.

Plate 8 has two opposite engaging zones 42 by means of which plate 8 is engaged under the flanges 7 of section 3, when it is rotated from its free position to its retained position (FIG. 9). These zones 42 are situated at two opposite angles of plate 8, each on the same side of plane P—P as the edge 23 associated with the opposite longitudinal side of plate 8.

In these engaging zones 42, the corner of plate 8 is considerably rounded so as to prevent the plate from abutting against the side wall 6 of the section, where it rotates from one position to the other. Furthermore, plate 8 has in these two zones, on its base directed toward wedge 14, two oblique clearance portions (FIGS. 1, 3, 6 and 8) which, in the example illustrated, have been shown simply by slight bending of plate 8. At the rounded corner 42 of the plate, the depth of this clearance must be at least equal to the thickness of the metal sheet of section 7, reduced by the thickness of boss 37, since this latter is still fitted between the flanges of section 3.

The operation of the device of the invention will now be described and combination thereof with the section.

At rest (FIGS. 6 and 7), spring 13 urges plate 8 against the flat face of boss 37.

To fix a strip 2 or other object to section 3, device 1 is gripped by wedge 14 and is presented above the section 3 so that the longitudinal direction of plate 8 is parallel to that of section 3. The stirrup piece 22 is engaged between the flanges 7 of section 3. Plate 8 and boss 37 are engaged between flanges 7. On the other hand, boss 34 which is then transversal to the longitudinal direction of the section cannot penetrate between flanges 7. Still holding the device by wedge 14, this latter is rotated in a clockwise direction (FIGS. 8 and 9). Stirrup piece 22 rotates plate 8 and, because of the clearance provided in the two engagement zones 42, these latter engage automatically under flanges 7, with spontaneous compression of spring 13. The arcs of a circle 41 guide the device during rotation with respect to section 3. Rotation is continued until arms 23 abut against the end walls 33 (FIGS. 1 and 10) of flanges 7. At this stage, boss 34 fits between flanges 7, which allows a slight relaxation of spring 13 and allows at the same time teeth 36 to interengage with notches 31 of section 3. Despite that, since it is provided that the sum of the thicknesses of bosses 34 and 37 is less than the thickness of the metal sheet forming the section 3, plate 8 in the retained position abutts against flanges and not against the flat wall of boss 37.

In this position, even before clamping, spring 13 ensures sufficient interengagement between teeth 36 and notches 31 to prevent any accidental sliding of device 1 along section 3. If it is desired to change the position of device 1 along section 3, it is sufficient to exert a pull on wedge 14, which draws stirrup piece 22 towards plate 8 while compressing spring 13, and frees teeth 36 from notches 31. It is then possible to slide the device easily along section 3 by exerting a force in the desired direction on wedge 14. At this stage, the object to be fixed is brought against face 18 of the wedge, then screw 11 is introduced. During screwing, plate 8 is secured against rotation by the abutment of arms 23 against flanges 7. If an axial thrust is exerted on shank 11, this tends to compress spring 13 so as to reinforce engagement of teeth 36 and notches 31. There is then no risk of device 1 slipping. Once the clamping is finished, it is no longer possible to free teeth 36 from notches 31, short of unscrewing of course.

As the right-hand part of FIG. 5 shows, the notches may also be formed as grooves 43, transversal to the section and occupying the whole of the outer face of flanges 7. Such grooves offer a longer life and a better grip, but are more costly to form.

In the example in FIG. 12, two fixing devices 1a, 1b have been used for fixing a perforated strip 2 to two parallel and vertical sections 3a, 3b having their longitudinal opening substantially in the same plane.

In this example, face 18 of wedges 14 has two hooks 44 which are directed upwardly when plate 8 is in the retained position. These hooks 44 are engaged in some of the perforations of strip 2, which allows strip 2 to be fixed temporarily before final clamping by means of screw 11. Furthermore, if it is desired to move one of the devices 1a to 1b, along its section 3a or 3b, when strip 2 has been temporarily positioned on the hooks 44, it is sufficient to pull strip 2 at the location of device 1a and to adjust the height of strip 2 as desired. In effective, when strip 2 is thus pulled, strip 2 pulls with it wedge 14 via hooks 44, which causes disengagement of teeth 36 with respect to notches 31 and allows the device to slide in section 3.

The example of FIG. 13 is similar to that of FIGS. 1 to 11, except that plate 8 has substantially the shape of a parallelogram whose longitudinal direction is at an angle with respect to that of bases 17 and 18 of wedge 14, so that the small sides of the plate are parallel to the small sides of bases 17 and 18. This version of the invention has the advantage that a rotation less than a quarter of a turn is sufficient for the plate to pass from its free position to its retained position.

In the example of FIG. 14, which will only be described insofar as the differences are concerned with respect to the example of FIGS. 1 to 11, plate 8 carries a cylindrical rod 51 which is engaged in the axial passageway 56 of wedge 54 whose outer wall is cylindrical. The threaded tapping 59 is formed at the end of rod 51 opposite plate 8, this end being recessed with respect to the base 58 of wedge 54 opposite section 3. In addition, rod 51 carries a lateral tenon 61 permanently engaged in a groove 62 of passageway 56 so as to rotatably interlock the rod 51, and so plate 8, with wedge 54. On the side opposite section 3, the passageway 56 is widened by a shoulder 63 on which spring 53 can bear, whose other end rests against a removable lock ring 64 mounted about rod 51 adjacent its end opposite plate 8.

The variation of FIG. 15 is very closely related to that of FIG. 14, except that rod 51 carries at its end an external threaded portion 66 and not the screw tapping 59. In this example, threaded rod 51 projects from passageway 56.

These two variations which are used substantially in the same way as the variation of FIGS. 1 to 10, has the advantage of not obstructing the internal channel of section 3. Thus, it is practically certain that when the device is caused to slide along section 3, it does not risk coming into abutment for example against a screw securing bottom 4 of section 3.

The construction shown in FIGS. 16 to 19 will only be described insofar as its differences are concerned with respect to FIGS. 1 to 11.

Wedge 14 is formed in two parts, namely substantially parallelepipedic body 71 made from aluminium alloy, and a flexible plastic material sole piece 72 carrying the stirrup piece 22 as well as the rows of teeth 36.

At both its ends, between which the rows of teeth 36 extend, sole piece 72 carries hooks 73 which in operation are snap-fitted into two opposite profiled cavities 74 provided in the lateral wall of body 71.

In addition, body 71 has an internal substantially parallelepipedic cavity which opens on the same side as sole piece 72 and which is closed on the side opposite section 3 by a web 77 through which passes a central bore 78 into which fits screw 11 during service. In cavity 76 is fitted a bridge 79 having a U-shaped profile which forms a single block with two shoes 81 each of which carries a part of each row of teeth 36 and one of the hooks 73.

The central part of bridge 79 has passing therethrough an orifice 82 for insertion of screw 11 which, in service, is between the two shoes 81. Orifice 82 is defined by a substantially frustoconical lip 83 which causes orifice 82 to be offset in the direction of section 3 with respect to the plane of the central part of bridge 79. The thickness of lip 83 gradually tapers from its root towards its end which defines orifice 82. The diameter of this latter corresponds substantially to that of the thread bottoms of screw 11, and is in any case less than that of the thread apexes.

The two arms 23 of stirrup piece 22 are each fitted to one of shoes 81 and are offset as was mentioned in connection with FIGS. 1 to 11.

Figures 16, 17:
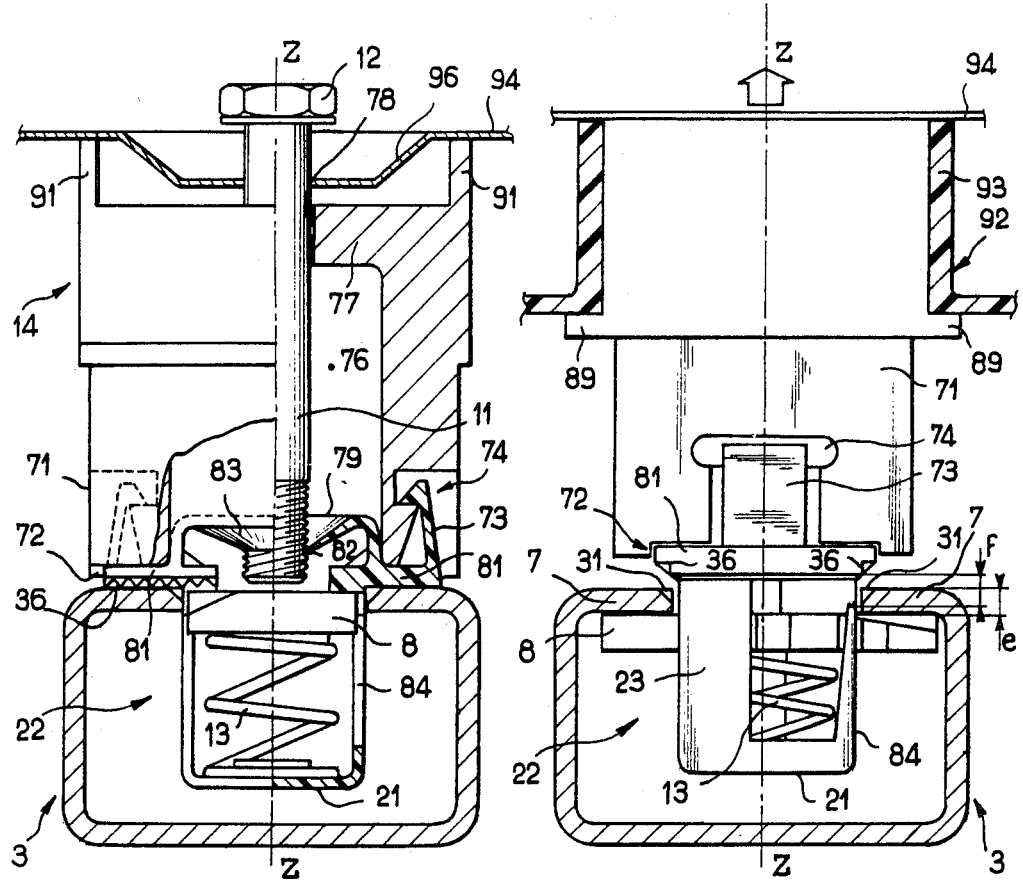
FIG. 16 is a side elevational view of a variation of the invention, before the plate is engaged under the flanges of the support member, with the profiled element shown in cross-section and the right-hand part of the device shown in section through the same plane.
FIG. 17 is an elevational view of the device of FIG. 16, with the profiled element shown in cross-section, the plate being engaged under the flanges of the section and the wedge being raised for translational movement in the support section.
Figures 18, 19:
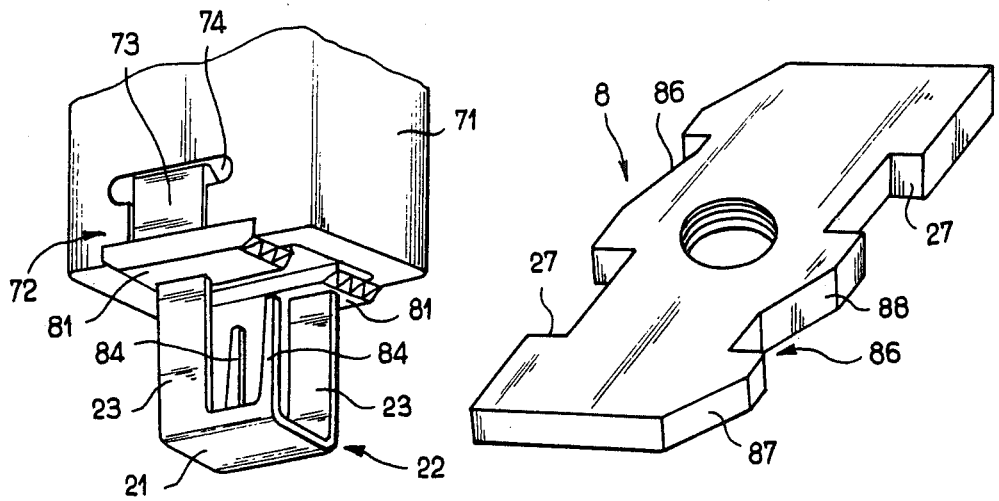
FIG. 18 is a partial view of the device of FIGS. 16 and 17, seen at the same perspective angle as in FIG. 2.
FIG. 19 is a view of the plate of FIGS. 16 and 17, shown at the same perspective angle as in FIG. 3.

Furthermore, as is shown in FIGS. 17 and 18, bottom 21 carries in the plane of each arm 23 a tooth 84 directed towards body 71 parallel to axis Z—Z. Distance f between the free end of each tooth 84 and the base of the adjacent shoe 81 is substantially equal to the thickness e of the flanges 7 of section 3. Moreover, tooth 84 is positioned so that, at each side of plate 8 in the clamping position (FIG. 17), arm 23 is substantially in contact with one of the flanges 7 of section 3 whereas tooth 84 is only slightly offset towards arm 23 with respect to the plane passing parallel to axis Z—Z through the edge of the other flange 7.

Besides the two cutouts 27 for arms 23, plate 8 further comprises two cutouts 86 for receiving teeth 84. The angles 87 of plate 8 adjacent to the cutouts 86 are bevelled. Similarly, the cutouts 86 seen in a plane view, form a bevel 88 on the same side of the adjacent cutout 27.

Furthermore, body 71 carries at mid-height on its two faces which are parallel to the longitudinal direction of section 3 when plate 8 is in the clamping position, two flat flanges 89.

The operation is as follows: the introduction and locking of wedge 14 in section 3 are carried out as in the embodiment shown in FIGS. 1 to 11. Because of the gap f (FIG. 17), teeth 84 do not oppose the locking for the flanges can be engaged between shoes 81 and teeth 84. Before or after locking, screw 3 is introduced into orifice 82 by a simple pressure (FIG. 16). Because of the conical lip 83, it is then impossible to withdraw screw 11 by pulling and screw 11 is then an efficient means for gripping the assembly for the device even before screwing. If needed however, screw 11 may be withdrawn from orifice 82 by unscrewing. With flanges 89, a plastic material element 92 (FIG. 17), having an orifice designed by a frame 93 which fits over body 71, can be fixed to body 71. The axial dimension of frame 93 is equal to the distance between flanges 89 and the top of ribs 91. Thus, element 92 is locked in position by any element fixed on ribs 91, for example a perforated plate 94 for securing apparatus. Plate 94 has preferably a truncated cone-shaped depression 96 intended to be located between the two ribs 91 so that head 12 of screw 11 does not project after tightening. An additional advantage of the invention can be seen here, namely the possibility of fixing several elements with the same device under guaranteed conditions insofar as the stability of fixing is concerned. Once elements 92 and 94 have been positioned and screw 11 held by lip 83, the fixing device can be slid along section 3 providing that wedge 14 of section 3 is slightly raised by pulling screw 11 via plate 94 so as to free teeth 36 from the notches 31 of section, as shown in FIG. 17. Since in general the wedge is raised a little more than is strictly necessary, teeth 84 are then engaged between flanges 7. Thus, even if it is no longer possible to have access to body 71 of wedge 14, for example when plate 94 is large sized, plate 8 cannot rotate while the wedge is moved along section 3.

We have seen during the whole description that the different devices described and shown allow the device to be engaged, placed in the retention position and slid in section 3, simply by handling wedge 14, 54, without ever having to put one's fingers in the section or use a tool. Furthermore, with the device in accordance with the invention the position of the device along the section can be chosen and maintained much more conveniently and the object can be secured much more stably to the section.

Of course, the invention is not limited to the examples described and shown, and numerous modifications may be made to these examples without departing from the scope or spirit of the invention.

Thus the thickness of the wedge may vary greatly depending on the requirements, and be for example reduced to a thickness of about 1 mm if questions of space saving make it necessary.

The springs used may be of different types, for example blade springs.

In the embodiment of FIG. 12, a single hook 44 may be provided for each device instead of two.

We claim:

1. A device for securing an object by screwing to a channel member having two flanges (7) directed substantially towards one another and defining therebetween a longitudinal opening, this device comprising:
   (a) a wedge member having a through bore and a channel member engaging face adapted to engage an outer face of both flanges;
   (b) a bolt including in turn:
      a first retaining member in the form of an elongated plate (8) rotatable in a plane substantially parallel to that of the flanges (7) of the channel member (3) between a free position in which a longitudinal direction of the plate is substantially parallel to a longitudinal direction of the channel member, and a retained position in which said plate (8) engages an inner face of both flanges (7) of the channel member;
      a second retaining member (12) facing toward a face of the wedge member which is remote from the channel member engaging face;
      a connection rod (11, 51) secured to one of the retaining members (8, 12) and provided with a threaded portion adapted to threadingly engage a threaded bore of the other retaining member;
   (c) resilient means urging the plate (8) towards the channel member engaging face of the wedge member; wherein
   (d) the wedge member is interlocked with the plate for rotation about an axis (Z—Z) parallel to that of the connecting rod;
   (e) the wedge member has on its channel member engaging face (17) at least one boss (34) adapted to fit between the flanges of the channel member (3) when the plate (8) is in the retained position; and
   (f) the plate is provided with two opposite engagement zones (42) which are positioned to be the first portions of the plate to engage behind the flanges upon rotation of the plate from the free position towards the retained position, and which are spaced apart from the channel member engaging face of the wedge even when the resilient means is the least stressed.

2. A device according to claim 1, wherein when the resilient means is the least stressed, the boss engages the plate apart from the engagement zones.

3. A device according to claim 1, wherein the engagement zones are bevelled faces carried by the plate and facing toward the channel member engaging face of the wedge member.

4. A device according to claim 1, wherein the wedge member and the plate form together an assembly carrying abutment means adapted to abut against portions of the channel member when the wedge member tends to rotate beyond the retained position of the plate.

5. A device for securing an object by screwing to a channel member having two flanges (7) directed substantially towards one another and defining therebetween a longitudinal opening, this device comprising:
   (a) a wedge member having a through bore and a channel member engaging face adapted to engage an outer face of both flanges;
   (b) a bolt including in turn:
      a first retaining member in the form of an elongated plate (8) rotatable in a plane substantially parallel to that of the flanges (7) of the channel member (3) between a free position in which a longitudinal direction of the plate is substantially parallel to a longitudinal direction of the channel member, and a retained position in which said plate (8) engages an inner face of both flanges (7) of the channel member;
      a second retaining member (12) facing toward a face of the wedge member which is remote from the channel member engaging face;
      a connecting rod (11) secured to one of the retaining members (8, 12) and provided with a threaded portion adapted to threadingly engage a threaded bore of the other retaining member;
   (c) resilient means urging the plate (8) towards the channel member engaging face of the wedge member;
   (d) a stirrup (22) having two arms (23) an end of which is secured to the wedge member adjacent the channel member engaging face and between which the plate (8) is slidably and unrotatably mounted;
   wherein the resilient means comprise a spring (13) inserted between the plate (8) and a central part (21) connecting the two arms of the stirrup, this latter protruding in use in the channel member between both flanges (7) of the channel member (3), the space required by the stirrup being sufficiently small not to hinder rotation of the wedge member (44) and of the plate (8) between the free and retained positions.

6. The device according to claim 5, wherein the arms (23) of the stirrup (22) are offset with respect to a plane (P—P) passing through the rotational axis (Z—Z) of plate (8) parallel to a width of the plate (8), each of said arms (23) being on a respective side of said plane (P—P) towards which this latter moves when plate (8) is rotated from the free positions to the retained position, in which latter position each of the arms (23) abuts against a respective flange (7) of the channel member (3) and thus prevents the plate (8) from going beyond the retained position.

7. The device according to claim 6, wherein the stirrup (22) further comprises, on each longitudinal side of the plate (8), a projection (84) which, when said plate (8) is in the retained position, is situated between the arm (23) which is adjacent said side of the plate and a plane parallel to the connecting rod (11) and passing through the edge of the flange (7) remote from said arm (23), and wherein, between the projection (84) and the channel member engaging face of the wedge member (14), there is provided a distance (f) substantially equal to the thickness (e) of the flanges (7) of the channel member (3).

8. A device for securing an object by screwing to a channel member having two flanges (7) directed substantially towards one another and defining therebetween a longitudinal opening, this device comprising:
(a) a wedge member having a through bore and a channel member engaging face adapted to engage an outer face of both flanges;
(b) an elongated plate (8) rotatable in a plane substantially parallel to that of the flanges (7) of the channel member (3) between a free position in which a longitudinal direction of the plate is substantially parallel to a longitudinal direction of the channel member, and a retained position in which said plate (8) engages an inner face of both flanges (7) of the channel member;
(c) a connecting rod (11) secured to a head (12) adapted to face the wedge member remote from the channel member engaging face and provided with a threaded portion adapted to threadingly engage a threaded bore of the plate;
(d) resilient means urging the plate (8) towards the channel member engaging face of the wedge member;
(e) a flexible lip-(83) mounted in the wedge member (14) and directed obliquely towards the axis of the rod (11) and towards the plate (8), the lip defining an orifice (82) adapted to be occupied by the threaded portion of the connecting rod (11) and having a diameter less than that of thread crests of said threaded portion of said rod.

9. A device according to claim 8, wherein the wedge member has on its channel member engaging face (17) channel member adherence means (36) adapted to be released by lifting the wedge member from the flanges.

10. A combination including:
(a) a channel member having two flanges (7) directed substantially towards one another and defining therebetween a longitudinal opening;
(b) a wedge member having a through bore and a channel member engaging face adapted to engage an outer face of both flanges;
(c) a bolt including in turn
a first retaining member in the form of an elongated plate (8) rotatable in a plane substantially parallel to that of the flanges (7) of the channel member (3) between a free position in which a longitudinal direction of the plate is substantially parallel to a longitudinal direction of the channel member, and a retained position in which said plate (8) engages an inner face of both flanges (7) of the channel member;
a second retaining member (12) facing toward a face of the wedge member which is remote from the channel member engaging face;
a connecting rod (11, 51) secured to one of the retaining members (8, 12) and provided with a threaded portion adapted to threadingly engage a threaded bore of the other retaining member;
(c) resilient means urging the plate (8) towards the channel member engaging face of the wedge member;
wherein the channel member engaging face of the wedge member and an outer face of the flanges of the channel member having sliding resistance means (31, 36, 43) engageable under action of the resilient means and of mutual screwing of the first and second retaining members, and disengageable by lifting the wedge member from the flanges of the channel member, said adherence means being adapted, when interengaged, to restrain translational movement of the wedge member along the channel member.

11. The combination according to claim 10, wherein the sliding resistance means are notches (31, 32) provided respectively on the edge (29) of the external face of the flange (7) of the section (3) and on an edge (39) of a boss (34) of the wedge member (14, 54), said boss being adapted to fit between the flanges (7) of the channel member (3).

12. The combination according to claim 11, wherein the wedge member (14, 54) is connected to the plate (8) for rotation about an axis (Z—Z) parallel to that of the threaded portion (9, 59, 66), the boss (34) has two parallel opposite edges (39) on which notches (36) are provided, these parallel edges (39) being adjacent to the longitudinal ends (33) of the flanges (7) of the channel member (3) when the plate (8) is in the retained position.

13. The combination according to claim 10, wherein for securing perforated objects such as apparatus securing strips (2), a face (18) of the wedge member (14) adapted to support the perforated strip (2) has at least one hook (44) for attaching thereto the perforated object (2) before screwing.

14. The combination according to claim 10, wherein the wedge member has on an object supporting face two ribs (91) for securing a perforated plate (94) having bosses (96) projecting towards the channel member and wherein lateral faces of the wedge member which are parallel to the channel member when the plate (8) is in the retained position comprise a flange (89) for fixing an apertured object by insertion of said aperture around the wedge member between the flange (89) and a flat surface of the perforated plate (94), the wedge member being rotatably interlocked with the plate (8).

* * * * *